United States Patent [19]

Berni et al.

[11] 3,899,289

[45] Aug. 12, 1975

[54] TREATMENT OF COTTON WITH GLYCIDYL METHACRYLATE USING IONIZING RADIATION

[75] Inventors: Ralph J. Berni, Metairie; James A. Harris, Pearl River, both of La.

[73] Assignee: The United States of America as represented by the Secretary of Agriculture, Washington, D.C.

[22] Filed: Apr. 15, 1974

[21] Appl. No.: 461,182

Related U.S. Application Data

[62] Division of Ser. No. 309,833, Nov. 27, 1972, abandoned.

[52] U.S. Cl. ............ 8/120; 204/159.12; 204/160.1; 260/17.4 GC
[51] Int. Cl.² ........................................ D06M 13/00
[58] Field of Search ......... 8/120; 204/159.12, 160.1

[56] References Cited
UNITED STATES PATENTS
3,434,161  3/1969  Walsh ..................................... 2/243

3,829,290  8/1974  Berni et al. ............................. 8/120

OTHER PUBLICATIONS

Walsh et al., –Textile Research Journal– Vol. 35, July, 1965, pp. 648–654.

Primary Examiner—John C. Bleutge
Assistant Examiner—C. J. Seccuro
Attorney, Agent, or Firm—M. Howard Silverstein; Max D. Hensley

[57] ABSTRACT

A method of instituting "ease of processing" while imparting durable press properties to cellulosic textiles has been developed which comprises free radical polymerization grafting, followed by heat curing with a Lewis acid or base catalyst. An alternate procedure for attaining the final product consisting of etherification of sodium cellulosate with glycidyl methacrylate followed by crosslinking using ionizing radiation is also proposed.

1 Claim, No Drawings

TREATMENT OF COTTON WITH GLYCIDYL METHACRYLATE USING IONIZING RADIATION

A non-exclusive, irrevocable, royalty-free license in the invention herein described throughout the world for all purposes of the United States Government with the power to grant sublicenses for such purposes, is hereby granted to the Government of the United States of America.

This is a division of application Ser. No. 309,833, filed Nov. 27, 1972, now abandoned.

This invention relates to the chemical treatment of cotton textiles to impart improved wrinkle recovery properties with "ease of processing." Specifically, the invention relates to treatments involving free radical polymerization of monomers on to cellulose. More specifically, this invention relates to a multi-step process for the preparation of durable press textile products wherein (1) the properties of the cotton cellulose are selectively and permanently changed by a free radical initiated graft copolymerization process and then (2) the modified cotton is fashioned into end use products and (3) the products are then oven-cured or vapor-cured with Lewis acid or Lewis base catalysts to give products with high wrinkle recovery. The resultant textile products have improved wrinkle recovery properties which are translated into smooth-drying properties after home laundering and tumble drying, thus eliminating the need for ironing by the consumer.

DEFINITION

"Ease of processing" is defined here as the advantage gained by cutters and fabricators in handling a textile during the period before it is crosslinked; hence, garments can be completely formed with the necessary chemicals in them with only the need for the final curing step to obtain the permanents press properties.

The main object of the instant invention is to provide a process utilizing a reactive monomer which, after reaction with cotton in ionizing radiation, can (because of pendant reacted epoxide groups) be heat cured in the presence of a crosslinking catalyst (Lewis acid or Lewis base) to provide permanent press properties to cotton fabric.

Prior art processes are available using vinyl monomers reacted with cellulose in the presence of free radical initiators. In these processes, the polymerized fabrics are then reacted with another crosslinking agent to incorporate permanent press properties. This addition of another agent causes increased expense to the process and often causes additional problems such as chlorine retention due to the presence of nitrogenous groups in the crosslinking resin.

The present process requires no addition of crosslinking agent after the ionizing radiation step since it employs the versatile monomer glycidyl methacrylate (GMA). GMA can be grafted onto cotton having free radical sites provided by previous exposure to ionizing radiation. Furthermore, the GMA retains its epoxide groups throughout this initial reaction period. The cotton can then be fabricated into end products such as garments, while it is in an uncrosslinked state, allowing for greater mobility of the fibers and easy handling by cutters and fabric workers. The garment can be completely manufactured or individual fabric samples can be processed as required without danger of the crosslinking reaction occurring during normal handling. The garment or fabric can then be treated by any number of currently used curing processes in the presence of either liquid or gaseous Lewis acid or base catalysts to form crosslinkages between the pendant epoxide groups and the cellulose hydroxyls.

It should be pointed out that any number of concentration ratios of GMA:water:methanol can suffice to provide enough polymerized GMA to afford the starting material necessary to give the final permanent press properties. For example, increasing the GMA concentration to higher levels will increase the rate of polymerization; whereas, decreasing the water concentration to zero will decrease the rate of polymerization (see Example 2).

The preferred process allows for cutting and shaping the garments before the crosslinking step is completed. The steps of the instant invention are illustrated by the following equations:

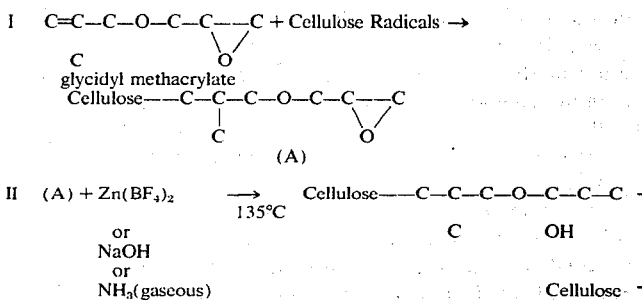

Although the aforementioned process is the preferred embodiment of the instant invention, it should be noted that the end product can also be obtained by reaction of a tertiary butyl alcoholic solution of the glycidyl methacrylate with cotton in the form of sodium cellulosate. In this fashion the epoxide groups are first attached to the fabric by base catalysis. The modified cellulose can then be treated with ionizing radiation in various solvents to effect crosslinking through pendant double bonds.

SUMMARY OF DISCLOSURE

This specification discloses a method of instituting "ease of processing" in the preparation of cellulosic textiles with durable press properties comprising processing by a preferred method, the steps being:

a. drying cotton or other cellulosic textile to about 2% water content by heating the textile in an inert atmosphere to not more than 50°C, b. deaerating the dehumidified textile by passing nitrogen through it, c. irradiating the dehumidified and deaerated cellulosic textile up to a dosage of 1 megarad with a cobalt 60 gamma radiation source, d. immersing the irradiated material of (c) in an aqueous solution containing 55 parts by volume of glycidyl methacrylate, about from 0 to 68 parts by volume of water, and about from 18.1 to 181 parts by volume of methanol, for periods of time of about 1 to 5 minutes at room temperature, the time period being contingent on the degree of polymerization desired, e. washing the unreacted glycidyl methacrylate off the poly(glycidylmethacrylate) graft polymerized fabric and drying, f. wetting the dried graft-polymerized textile of (e) with an aqueous solution containing a metallic fluoborate or other Lewis acids or Lewis bases selected from the group consisting of:

cadmium fluoborate,
lead fluoborate,
copper fluoborate,
zinc fluoborate,
nickel fluoborate,
zinc perchlorate,
aqueous sodium hydroxide,
gaseous ammonia, and
aqueous quaternary hydroxide, and g. curing the catalyzed textile for about 5 minutes at 135°C.

As an alternate procedure, the following steps can be taken:

a. slack mercerizing a cotton or other cellulosic textile, rinsing and neutralizing with dilute acetic acid, b. reacting the wet mercerized textile by impregnation with a 1 Molar sodium methoxide in methanol solution to yield the sodium cellulosate, c. washing the sodium cellulosate free of unreacted sodium methoxide with tertiary butyl alcohol, d. immersing the wet fabric of (c) in 60% solution of glycidyl methacrylate in tertiary butanol to react for 1 hour at about 70°C, and washing and drying the reacted cellulosate, e. irradiating the dry fabric of (d) to 1 megarad with a cobalt 60 gamma radiation source, and f. further reacting the textile with a water-methanolglycidyl methacrylate solution, then washing with water and drying.

The following examples are provided to illustrate the invention in more detail.

EXAMPLE 1

Cotton printcloth (84 × 77, yarn count) was dried to less than 2% moisture in a vacuum oven at 50°C, sealed in a nitrogen atmosphere in a thin Pyrex glass container and irradiated to a dosage of 1 megarad by cobalt-60 gamma radiation. One day later the radiation-activated fabric was immersed in a solution comprising 55 parts by volume of glycidyl methacrylate, 66 parts by volume of water, and 181 parts by volume of methanol, at 25°C in the absence of oxygen for 5 minutes. The final add-on was 29.68% of poly(glycidylmethacrylate). The graft copolymerized fabric was washed and dried in air and a portion was tested for wrinkle recovery. Another portion was rewetted by padding to a 100% wet-pickup with 50 ml of an aqueous solution containing 2 ml of 40% $Zn(BF_4)_2$ solution. The fabric was then cured in a forced draft oven at 135°C for 5 minutes. This fabric was washed in methanol, water, and ironed dry. The wrinkle recovery of the control fabric was 187° and 125° (W+F), conditioned and wet, respectively; the recovery of the polyglycidylmethacrylated fabric was 192° and 197°, conditioned and wet, respectively, while the acid catalyzed, crosslinked fabric was 296° and 260° (W+F), conditioned and wet, respectively. The final fabric properties included 8.1 lbs. fill breaking strength and 13.3% fill elongation at break. A period of 2 weeks elapsed between the ionizing radiation step and the zinc fluoborate curing proving the utility of the process in delayed cure reactions for permanent press properties. The fabrics had a Monsanto Permanent Press rating of 4 before and after home laundering.

EXAMPLE 2

Three cotton fabric samples were treated as in Example 1, above, with exceptions as noted in the table.

| Sample No. | Grafting Solution (parts by volume) | | | GMA (% add-on) | Wrinkle Recovery (W+F) (degrees) | |
|---|---|---|---|---|---|---|
| | GMA | H₂O | MeOH | | Dry | Wet |
| 2A | 5.5 | 0 | 24.9 | 4.98 | 200 | 172 |
| 2B | 5.5 | 1.5 | 23.4 | 7.77 | 198 | 169 |
| 2C | 5.5 | 3.5 | 21.4 | 16.02 | 211 | 153 |

The glycidyl methacrylated fabrics were treated as in Example 1 with the exception that only 1 ml of $Zn(BF_4)_2$ solution (40%) was used in the pad bath. Final fabric properties are listed in the following table.

| Sample No. | Wrinkle Recovery (W + F)° | | Fill Brk. Strg. (pounds) | Fill Elongation (%) |
|---|---|---|---|---|
| | Dry | Wet | | |
| 2A | 244 | 227 | 9.8 | 12.9 |
| 2B | 264 | 233 | 12.2 | 12.8 |
| 2C | 278 | 254 | 15.1 | 15.1 |

The following examples (3, 4, and 5) show that with critical controls on conditions the process can be reversed to give increased wrinkle recovery.

EXAMPLE 3

Cotton fabric (80 × 80 printcloth) weighing approximately 10 gm was rolled and placed in a reaction vessel and allowed to slack mercerize in 23% NaOH for 30 minutes, rinsed in water, three times, neutralized and solvent exchanged five times in absolute methanol, then reacted with one molar sodium methoxide solution in methanol while dry nitrogen is bubbled through the solution to prevent oxidation. A test fabric is removed showing 1.8 meq Na⁺ per gram of fabric.

The reaction solution was removed and the treated fabric was rinsed three times in tertiary butyl alcohol to remove excess sodium methoxide and methanol. The fabric was then immersed in a 60% solution of glycidyl methacrylate in butyl alcohol and the sodium cellulosate fabric reacted for 1 hour at 70°C. Fabric wrinkle recovery was 192° dry and 268° wet (W+F), with a weight add-on of 16%. The washed and dried fabric is then given 1 megarad ionizing radiation and then reacted with additional glycidyl methacrylate (55 parts) in water (66 parts)-methanol (181 parts) solvent, to a 11.81% add-on. The final fabric, after washing and drying, had a conditioned (dry) and wet wrinkle recovery of 266° and 291° (W+F), respectively, and 30.4 pounds warp breaking strength.

EXAMPLE 4

Fabric treated as in Example 3 with the exception that the concentration of the glycidyl methacrylate solution was altered. This fabric was reacted in a 12.5% solution of glycidyl methacrylate dissolved in tertiary butyl alcohol (250 ml. total volume) for 3 hours at 70°C. The resultant fabric after washing in methanol and hot tap water for 30 minutes had a weight add-on of 16.3% and a dry and wet wrinkle recovery of 189° and 270° (W+F), respectively, and a warp breaking strength of 49.8 lbs. and a 29.3% elongation at break. The fabric was then given 2 megarads of ionizing rediation from the cobalt-60 source. The resultant fabric had a dry and wet wrinkle recovery of 241° and 294° (W+F), respectively. The fabric also had a breaking strength of 33.4 pounds.

EXAMPLE 5

Fabric was treated as in Example 3 with the exception that a 20% solution of methacrylate was used to give a fabric having 17.1% add-on of glycidyl methacrylate. This fabric had dry and wet wrinkle recovery properties of 184° and 269° (W+F), respectively, 48.0 lbs. breaking strength and 9.5% elongation at break. The fabric was then immersed in 40% methanol and given 2 megarads of ionizing radiation. The fabric had dry and wet wrinkle recovery of 218° and 311° (W+F), respectively, 28.6 lbs. of warp breaking strength.

We claim:

1. A process for imparting durable press with "ease in processing" comprising:
   a. slack mercerizing a cotton or other cellulosic textile, rinsing and neutralizing with dilute acetic acid,
   b. reacting the wet mercerized textile by impregnation with a 1 Molar sodium methoxide solution in methanol to yield the sodium cellulosate,
   c. washing the sodium cellulosate free of unreacted sodium methoxide with tertiary butyl alcohol,
   d. immersing the wet fabric of (c) in 60% solution of glycidyl methacrylate in tertiary butanol to react for 1 hour at about 70°C, and washing and drying the reacted cellulosate,
   e. irradiating the dry fabric of (d) to 1 megarad with a cobalt 60 gamma radiation source, and
   f. contacting the textile with a 50% watermethanol-glycidyl methacrylate solution, then washing with water, and drying.

* * * * *